United States Patent
Hunt

(10) Patent No.: US 7,146,319 B2
(45) Date of Patent: Dec. 5, 2006

(54) PHONETICALLY BASED SPEECH RECOGNITION SYSTEM AND METHOD

(75) Inventor: Melvyn J. Hunt, Cheltenham (GB)

(73) Assignee: Novauris Technologies Ltd. (GB)

( * ) Notice: Subject to any disclaimer, the term of this patent is extended or adjusted under 35 U.S.C. 154(b) by 528 days.

(21) Appl. No.: 10/401,572

(22) Filed: Mar. 31, 2003

(65) Prior Publication Data

US 2004/0193408 A1    Sep. 30, 2004

(51) Int. Cl.
G10L 15/04    (2006.01)

(52) U.S. Cl. .................. 704/254; 704/243; 704/231; 704/249

(58) Field of Classification Search ............. 704/254, 704/243, 256, 255, 249, 1, 241, 270.1, 9, 704/2, 231, 240, 245, 257, 239, 268
See application file for complete search history.

(56) References Cited

U.S. PATENT DOCUMENTS

| | | | |
|---|---|---|---|
| 4,624,010 A * | 11/1986 | Takebayashi | 704/249 |
| 4,748,670 A | 5/1988 | Bahl et al. | |
| 4,783,803 A | 11/1988 | Baker et al. | |
| 4,803,729 A | 2/1989 | Baker | |
| 4,866,778 A | 9/1989 | Baker | |
| 5,027,406 A | 6/1991 | Roberts et al. | |
| 5,208,897 A * | 5/1993 | Hutchins | 704/200 |
| 5,222,190 A | 6/1993 | Pawate et al. | |
| 5,241,619 A | 8/1993 | Schwartz et al. | |
| 5,465,318 A * | 11/1995 | Sejnoha | 704/243 |
| 5,502,790 A * | 3/1996 | Yi | 704/256 |
| 5,822,730 A | 10/1998 | Roth et al. | |
| 5,920,837 A | 7/1999 | Gould et al. | |
| 6,023,677 A * | 2/2000 | Class et al. | 704/254 |
| 6,073,097 A | 6/2000 | Gould et al. | |
| 6,088,669 A | 7/2000 | Maes | |
| 6,122,613 A | 9/2000 | Baker | |
| 6,253,178 B1 | 6/2001 | Robillard et al. | |
| 6,260,013 B1 | 7/2001 | Sejnoha | |
| 6,343,270 B1 * | 1/2002 | Bahl et al. | 704/257 |
| 6,501,833 B1 * | 12/2002 | Phillips et al. | 379/88.07 |
| 6,684,185 B1 * | 1/2004 | Junqua et al. | 704/243 |
| 2001/0012999 A1 * | 8/2001 | Vitale et al. | 704/260 |
| 2003/0069730 A1 | 4/2003 | Vanhilst | |
| 2003/0229497 A1 * | 12/2003 | Wilson et al. | 704/270.1 |

FOREIGN PATENT DOCUMENTS

| | | |
|---|---|---|
| EP | 0953970 A1 * | 11/1999 |
| EP | 0907949 B1 * | 10/2001 |

OTHER PUBLICATIONS

X. Huang, "Spoken language processing: a guide to theory, algorithm, and system development", 2001, pp. 383-401 and pp. 622-639.

(Continued)

Primary Examiner—Vijay Chawan
(74) Attorney, Agent, or Firm—Shemwell Mahamedi LLP

(57) ABSTRACT

A speech recognition method includes a step of receiving a phonetic sequence output by a phonetic recognizer. The method also includes a step of matching the phonetic sequence with one of a plurality of reference phoneme sequences stored in a reference list that matches closest thereto. At least one of the plurality of reference phoneme sequences stored in the reference list includes additional information with respect to a phonetic sequence that is capable of being output by the phonetic recognizer.

37 Claims, 3 Drawing Sheets

OTHER PUBLICATIONS

F. Jelinek, "Statistical methods for speech recognition", 1997, chapter 5, pp. 80-103.

PCT/US04/09929—International Search Report and Written Opinion of the International Searching Authority, Feb. 15, 2006, 8 pages.

* cited by examiner

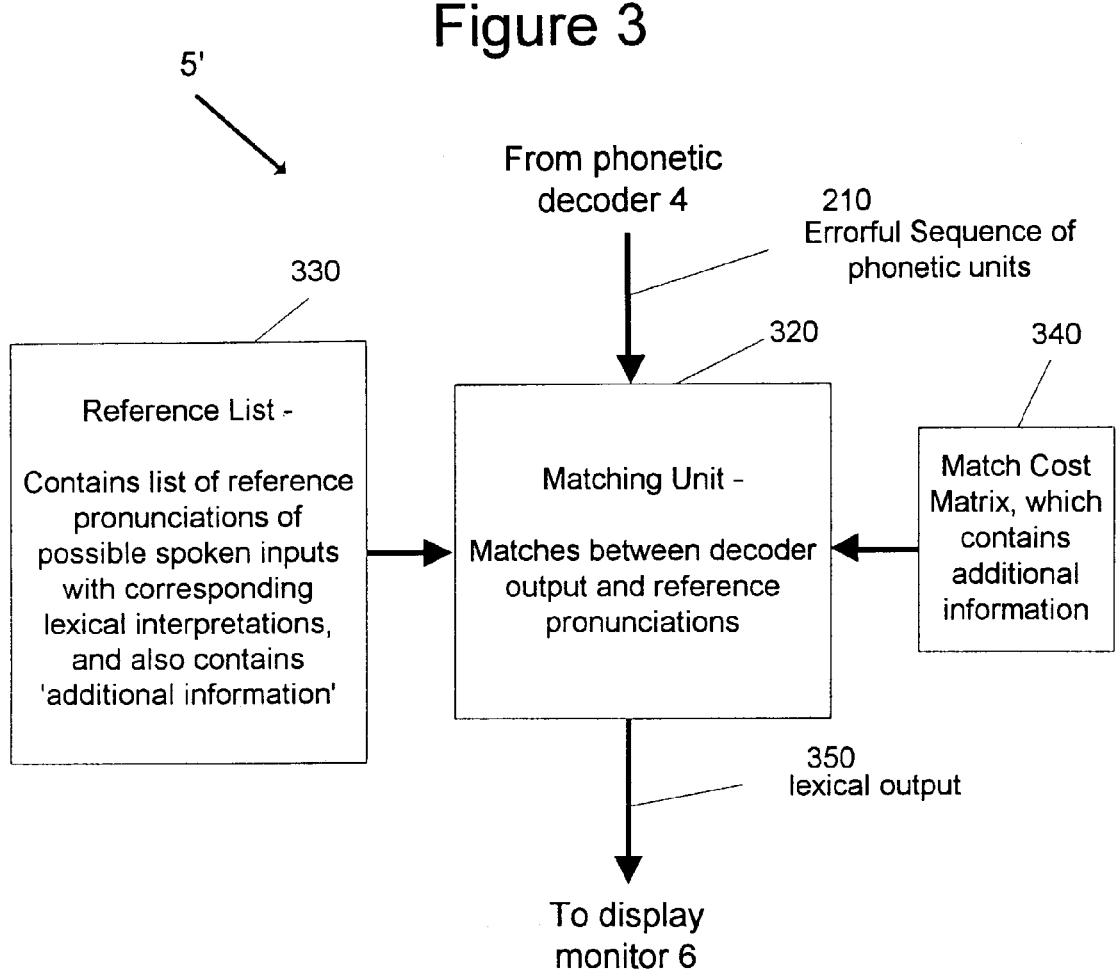

PHONETICALLY BASED SPEECH RECOGNITION SYSTEM AND METHOD

DESCRIPTION OF THE RELATED ART

One conventional system and method for carrying out automatic speech recognition is shown in FIG. 1.

Input speech is converted to an electrical signal in a microphone (module 1 in FIG. 1), and passed to an analog-to-digital converter (module 2), in order to convert the input speech to a digital signal. By way of example, the analog-to-digital converter module 2 operates at a sampling rate of 10 kHz and has a numerical precision of 16 bits. Most personal computers (PCs) on the market have such analog-to-digital converters.

In an alternative arrangement, the speech signal could be transmitted over a telephone connection or other communication system (e.g., LAN or WAN), or it could be supplied by a recording apparatus.

The digitized speech signal is then supplied to a spectral analyzer (module 3), which generates acoustic features. For example, the spectral analyzer module 3 generates acoustic features at a rate of one (1) every 10 or 20 msec. The set of acoustic features may, for example, comprise the first 13 cepstrum coefficients and their first and second derivatives with respect to time, as is known to those skilled in the speech recognition art.

The sequence of acoustic features then forms the input to a phonetic decoder (module 4), which matches this input against a set of models representing phonetic units, whereby this process is independent of the words to be ultimately recognized. The phonetic units making up the phonetic decoder module 4 may correspond approximately to the phonemes in the language, i.e., to single consonants and vowels. Sometimes, separate symbols are used for different levels of stress in some or all the vowels.

The publicly available toolkit, HTK, can, for example, be used to construct a phonetic decoder, and to build the models that it needs from a corpus of training speech. This toolkit can be obtained from the Internet, from the following Internet address: http://htk.eng.cam.ac.uk, which also provides access to "The HTK Book", by S. J. Young et al. HTK also provides an example of a suitable spectral analyzer.

The output of the phonetic decoder module 4 is a sequence of phoneme-like units. For some types of phonetic decoders, the output corresponds to a lattice of phonetic units rather than a single sequence, but for the sake of simplicity the rest of this description will assume a single sequence. Because of the inherent difficulties of speech recognition, the phonetic sequence is not normally an accurate phonetic transcription of the input, but rather an errorful sequence that loosely approximates such a transcription.

In FIG. 1, the speaker utters "James Smith" into the microphone 1, which results in an output of the phonetic decoder module 4 that corresponds to the errorful sequence /ch ey m s n ih/ (as compared to the correct phonetic reference /jh ey m z s m ih th/).

To determine the word or the sequence of words to which the utterance corresponds, the phonetic sequence output from the phonetic decoder module 4 is matched in a lexical interpreter (module 5) against a set of reference phonetic sequences corresponding to the possible lexical interpretations of the input. To accommodate known alternative pronunciations, more than one reference phonetic sequence may be used to represent a particular word or sequence of words. Turning now to FIG. 2, the lexical interpreter module 5 receives the sequence of phonetic units 210 output from the phonetic decoder module 4. The lexical interpreter module 5 also includes a matching unit 220 that matches the output of the phonetic decoder module 4 and reference pronunciations as obtained from a reference list 230. The reference list 230 contains a list of reference pronunciations of possible spoken inputs with corresponding lexical interpretations. The matching unit 220 also utilizes information from a match cost matrix 240 in making its match determination. The matching unit 220 outputs a lexical output 250, which is provided to the display monitor module 6 for display to a user.

The matching process performed by a lexical interpreter has to allow for discrepancies between the output of the phonetic recognizer module 4 and the reference sequence corresponding most closely to the lexical sequence that the speaker intended to produce. These discrepancies can have various causes, including unanticipated pronunciation variants or deficiencies in the accuracy of the phonetic recognizer (which corresponds to the phonetic decoder module 4 in FIG. 1). They can manifest themselves as insertions, deletions or substitutions of phonetic units in the output from the phonetic recognizer relative to the corresponding reference sequence.

In the face of such discrepancies, an efficient matching process utilizes estimates of the probabilities of insertions and deletions of each phonetic unit and of substitutions between each pair of phonetic units (including the probability that the phonetic unit produced by the phonetic recognizer and the corresponding reference unit is the same). A dynamic programming ("DP") string matching process can then be used to obtain a match score against every reference sequence, and the best scoring match can then be selected. One such dynamic programming string matching process is described in "An Overview of Sequence Comparison," by J. B. Kruskal, in "Time Warps, String Edits and Macromolecules: the Theory and Practice of Sequence Comparison," published by Addison-Wesley in 1983.

The inverse logarithms of the probabilities appear as costs in the matching process and are represented in a cost matrix. The required probabilities of insertions, deletions and substitutions can be estimated iteratively from lexically transcribed training material, in which the corresponding phonetic reference sequences are known, by using the matching process described above.

For example, one can take a corpus of training material that includes utterances similar to those that one wants to use in the system to recognize, but for which an accurate orthographic transcription is known. In this case, the phonetic decoder is used to produce a sequence of recognition symbols corresponding to each utterance, and each decoder sequence is matched against the corresponding reference sequence. For each kind of symbol occurring in the reference sequences, a determination is made as to the number of times that the matching process links each of the decoder sequences to it. One can also count the number of times that no decoder symbol is assigned to each reference symbol and the number of times that each decoder symbol is not assigned to any reference symbol. These counts provide the information needed to compute assignment and deletion probabilities, which are turned into penalty values by taking logs of the probabilities.

The matcher which is used to produce the alignment which derives the probabilities that are needed to obtain the penalties needs a set of penalties in order to operate. In this regard, one can refine the estimates of the best penalties iteratively. By way of example, the procedure starts off with a very simple set of penalties in which each decoder phoneme symbol is associated with the set of reference symbols corresponding to the same phoneme with probability P1 and all other associations between decoder phoneme symbols and reference phoneme symbols with a lower probability P2. An assumption is made that deletions are possible in all symbols in both sets with probability P3, which could be the same as P2.

A reasonable initial value for P1 might be 0.6. Since the probabilities must sum to 1, P2 then becomes 0.4 divided by the number of decoder symbols (N), assuming that P3=P2. This is because the 0.6 value corresponds to one of the decoder symbols, and so it is divided by the number of remaining symbols (N−1) plus the possibility of deletion (1).

A dynamic programming string-matching process can in principle provide a complete set of likelihood estimates that the spoken input corresponds to each of the sequences in the reference list. This is because any symbol produced by the decoder can with some penalty cost be associated with any symbol in the reference set, and any symbol in both the reference and the decoder sequences can be ignored (that is, deleted) with a certain penalty cost. The DP matching process finds for any given decoder sequence and any single given reference sequence the lowest total of penalty costs needed to link the two sequences, choosing which symbols to ignore and which to associate. The only major constraint on this process is that the order of symbols in each of the sequences cannot be changed.

As an abstract example, suppose an output of the phonetic decoder is a sequence A B, and suppose it is compared to a reference sequence C D. One possible alignment, associates A with C and B with D. Alternatively, if the penalties of those two associations are high, but the penalty of associating B with C is low, it might turn out that the lowest total penalty association is with A and D being deleted at some deletion cost and B and being associated with C at some low association cost. What DP matching will not allow is reordering so that B is associated with C and A associated with D (this would require time to run backwards).

An example is provided described below to show how the comparison process might work, using the "James Smith" utterance shown in FIG. 1. The reference sequence corresponding to James Smith in the notation described above with respect to other embodiments is:

/ JH EY M Z S M IH1 TH /,

Now, assume that there exists another, similar, reference sequence corresponding to "Jane Smythe", which would be given the following notation:

/ JH EY N S M AY DH /

A plausible output from the phonetic decoder 4 could be:

/ CH EY N S N IH TH S /

Tables 1 and 2 provided below show what the DP matcher might find, in this representative example, as the lowest penalty-cost alignments of the phonetic decoder output to the two names.

TABLE 1

Interpretation of the decoder sequence as "James Smith"

| Decoder | CH | EY | N | del | S | N | IH | TH | S |
|---|---|---|---|---|---|---|---|---|---|
| Ref | JH | EY | M | Z | S | M | IH | TH | del |
| | 1 | 2 | 3 | 4 | 5 | 6 | 7 | 8 | 9 |

TABLE 2

Interpretation of the decoder sequence as "Jane Smythe"

| Decoder | CH | EY | N | | S | N | IH | TH | S |
|---|---|---|---|---|---|---|---|---|---|
| Ref | JH | EY | N | | S | M | AY | DH | del |
| | 1 | 2 | 3 | 4 | 5 | 6 | 7 | 8 | 9 |

In column 1, the decoder symbol CH is associated with the reference symbol JH in both matches. The phonemes / CH / and / JH / are acoustically fairly similar, so the penalty will not be large, and in any case it applies equally to both alignments. The alignment in column 2 will also have a low penalty because it associates a phoneme with itself. The penalty will not in fact be zero because the penalties correspond to log probabilities and the probability of any phoneme being correctly recognized is not 100%. In column 3, the decoder symbol / N / is associated with / M / for James Smith and with / N / for Jane Smythe. The Jane Smythe hypothesis will incur a lower penalty here, but not by a lot because / M / and / N / are easily confused. In column 4, the James Smith hypothesis incurs a penalty for having to assume that the decoder failed to detect / Z / (this is actually very likely in this context, being followed by / S /, but the DP does not know about the context and will apply the standard deletion penalty). Column 4 is just a placeholder for the Jane Smythe hypothesis and does not incur any penalty. Skipping over columns 5 and 6, in column 7 the vowel / IH / in the decoder sequence is matched to the corresponding vowel / IH / in the James Smith reference sequence and to the different vowel / AY / in the Jane Smythe reference sequence. The penalty paid for associating / IH / with / AY / is likely to be large because the two vowels are acoustically very different. This might well mean that even though the Jane Smythe hypothesis scores the same or better everywhere else the James Smith hypothesis nevertheless gets a better total score. Column 8 is like column 3. Finally, column 9 shows what often happens when there is a small amount of noise at the end of an utterance which is misinterpreted by the decoder as a voiceless fricative. Both hypotheses have to pay a deletion penalty to ignore it.

Normally, the single best matching possible word sequence will be selected by the lexical interpreter module 5. In some alternative arrangements, the top N matching utterances may be selected, where N is either a predetermined integer or is based on a criterion concerning the relative quality of the matches. For sake of simplicity, only the output of the single best match will be considered hereinbelow. By way of example, the output of the lexical interpreter module 5 corresponds to words as ASCII characters.

Depending on the application, the lexical interpretation may simply be displayed visually (e.g., via a monitor of a PC) or converted back to speech using a text-to-speech synthesizer, or may be used to look up associated information (obtained from a database, for example), or may be used to control some other action. In the arrangement shown in FIG. 1 the utterance consists of a name, "James Smith", and the output consists of that name together with an associated telephone number (as obtained from a database that associates "James Smith" with the telephone number 613 929 1234). The two pieces of information are passed to a display monitor (module 6).

Modules 3, 4 and 5 in FIG. 1 may be realized as programs in a general-purpose computer.

While the system shown in FIG. 1 can work well, all speech recognition systems are subject to occasional errors. The error rate increases with factors such as the size and confuseability of the vocabulary, the quality of the acoustic signal, etc. This can make a speech recognition system impractical for certain challenging applications. Moreover, it is always desirable to have a speech recognition system respond more quickly or function on smaller, less expensive processing hardware, or both.

The present invention is directed to increasing the accuracy of a system having a structure is similar to that shown in FIG. 1 and to reducing the computational load, allowing faster responses or the use of less powerful processing hardware.

SUMMARY OF THE INVENTION

According to one embodiment of the invention, there is provided a speech recognition method, which includes a step of receiving an acoustic input, a step of converting the acoustic input to a digital signal, a step of performing spectral analysis on the digital signal to obtain acoustic features, a step of obtaining a phonetic sequence from the acoustic features of the digital signal, and a step of performing a lexical interpretation to obtain a phonetic reference that matches best to the phonetic sequence, wherein the set of phonetic units in the phonetic reference obtained during the step of performing a lexical interpretation is different from the set of phonetic units that can be produced in the step of obtaining a phonetic sequence from the acoustic features of the digital signal.

According to another embodiment of the invention, there is provided a speech recognition method, which includes receiving a phonetic sequence output by a phonetic recognizer. The method also includes matching the phonetic sequence with one of a plurality of reference phoneme sequences stored in a reference list that matches closest thereto. At least one of the plurality of reference phoneme sequences stored in the reference list is different from a phonetic sequence that is capable of being output by the phonetic recognizer.

According to yet another embodiment of the invention, there is provided a speech recognition apparatus that includes an input unit configured to receive a phonetic sequence output by a phonetic recognizer. The speech recognition apparatus also includes a reference list configured to store a plurality of reference phonetic sequences. The speech recognition further includes a matching unit configured to match the phonetic sequence received by the input unit with one of the plurality of reference phonetic sequences stored in the reference dictionary that matches closest thereto. At least one of the plurality of reference phonetic sequences stored in the reference list is different from a phonetic sequence that is capable of being output by the phonetic recognizer.

BRIEF DESCRIPTION OF THE DRAWINGS

The foregoing advantages and features of the invention will become apparent upon reference to the following detailed description and the accompanying drawings, of which:

FIG. 3 is a block diagram showing elements making up a lexical interpreter according to a first embodiment of the invention.

DETAILED DESCRIPTION OF SPECIFIC EMBODIMENTS

Figure 1:
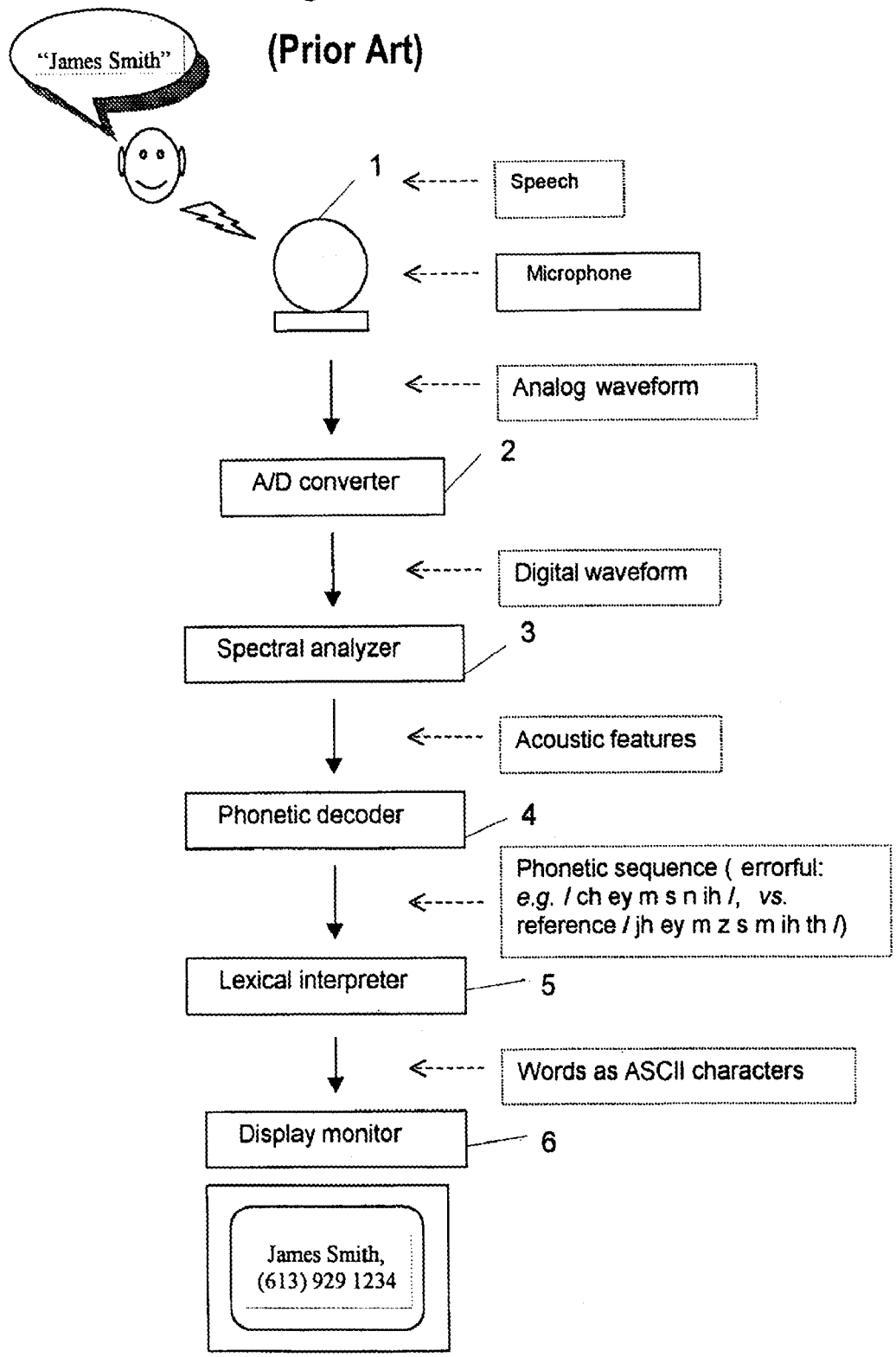
FIG. 1 is a block diagram of a conventional speech recognition device.

The invention is described below with reference to drawings. These drawings illustrate certain details of specific embodiments that) implement the systems and methods and programs of the present invention. However, describing the invention with drawings should not be construed as imposing, on the invention, any limitations that may be present in the drawings. The present invention contemplates methods, systems and program products on any computer readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising computer-readable media for carrying or having computer-executable instructions or data structures stored thereon. Such computer-readable media can be any available media which can be accessed by a general purpose or special purpose computer. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above are also be included within the scope of computer-readable media. Computer-executable instructions comprise, for example, instructions and data which cause a general purpose computer, special purpose computer, or special purpose processing device to perform a certain function or group of functions.

The invention will be described in the general context of method steps which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represent examples of corresponding acts for implementing the functions described in such steps.

The present invention in some embodiments, may be operated in a networked environment using logical connections to one or more remote computers having processors. Logical connections may include a local area network (LAN) and a wide area network (WAN) that are presented here by way of example and not limitation. Such networking environments are commonplace in office-wide or enterprisewide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

The following terms may be used in the description of the invention and include new terms and terms that are given special meanings.

"Linguistic element" is a unit of written or spoken language.

"Speech element" is an interval of speech with an associated name. The name may be the word, syllable or phoneme being spoken during the interval of speech, or may be an abstract symbol such as an automatically generated phonetic symbol that represents the system's labeling of the sound that is heard during the speech interval.

"Frame" for purposes of this invention is a fixed or variable unit of time which is the shortest time unit analyzed by a given system or subsystem. A frame may be a fixed unit, such as 10 milliseconds in a system which performs spectral signal processing once every 10 milliseconds, or it may be a data dependent variable unit such as an estimated pitch period or the interval that a phoneme recognizer has associated with a particular recognized phoneme or phonetic segment. Note that, contrary to prior art systems, the use of the word "frame" does not imply that the time unit is a fixed interval or that the same frames are used in all subsystems of a given system.

"Score" is a numerical evaluation of how well a given hypothesis matches some set of observations. Depending on the conventions in a particular implementation, better matches might be represented by higher scores (such as with probabilities or logarithms of probabilities) or by lower scores (such as with negative log probabilities or spectral distances). Scores may be either positive or negative. The score may also include a measure of the relative likelihood of the sequence of linguistic elements associated with the given hypothesis, such as the a priori probability of the word sequence in a sentence.

"Dynamic programming match scoring" is a process of computing the degree of match between a network or a sequence of models and a sequence of acoustic observations by using dynamic programming. The dynamic programming match process may also be used to match or time-align two sequences of acoustic observations or to match two models or networks. The dynamic programming computation can be used for example to find the best scoring path through a network or to find the sum of the probabilities of all the paths through the network. The prior usage of the term "dynamic programming" vanes. It is sometimes used specifically to mean a "best path match" but its usage for purposes of this patent covers the broader class of related computational methods, including "best path match," "sum of paths" match and approximations thereto. A time alignment of the model to the sequence of acoustic observations is generally available as a side effect of the dynamic programming computation of the match score. Dynamic programming may also be used to compute the degree of match between two models or networks (rather than between a model and a sequence of observations). Given a distance measure that is not based on a set of models, such as spectral distance, dynamic programming may also be used to match and directly time-align two instances of speech elements.

"Sentence" is an interval of speech or a sequence of speech elements that is treated as a complete unit for search or hypothesis evaluation. Generally, the speech will be broken into sentence length units using an acoustic criterion such as an interval of silence. However, a sentence may contain internal intervals of silence and, on the other hand, the speech may be broken into sentence units due to grammatical criteria even when there is no interval of silence. The term sentence is also used to refer to the complete unit for search or hypothesis evaluation in situations in which the speech may not have the grammatical form of a sentence, such as a database entry, or in which a system is analyzing as a complete unit an element, such as a phrase, that is shorter than a conventional sentence.

"Phoneme" is a single unit of sound in spoken language, roughly corresponding to a letter in written language.

"Phonetic label" is the label generated by a speech recognition system indicating the recognition system's choice as to the sound occurring during a particular speech interval. Often the alphabet of potential phonetic labels is chosen to be the same as the alphabet of phonemes, but there is no requirement that they be the same. Some systems may distinguish between phonemes or phonemic labels on the one hand and phones or phonetic labels on the other hand. Strictly speaking, a phoneme is a linguistic abstraction. The sound labels that represent how a word is supposed to be pronounced, such as those taken from a dictionary, are phonemic labels. The sound labels that represent how a particular instance of a word is spoken by a particular speaker are phonetic labels. The two concepts, however, are intermixed and some systems make no distinction between them.

"Spotting" is the process of detecting an instance of a speech element or sequence of speech elements by directly detecting an instance of a good match between the model(s) for the speech element(s) and the acoustic observations in an interval of speech without necessarily first recognizing one or more of the adjacent speech elements.

"Modeling" is the process of evaluating how well a given sequence of speech elements match a given set of observations typically by computing how a set of models for the given speech elements might have generated the given observations. In probability modeling, the evaluation of a hypothesis might be computed by estimating the probability of the given sequence of elements generating the given set of observations in a random process specified by the probability values in the models. Other forms of models, such as neural networks may directly compute match scores without explicitly associating the model with a probability interpretation, or they may empirically estimate an α posteriori probability distribution without representing the associated generative stochastic process.

"Training" is the process of estimating the parameters or sufficient statistics of a model from a set of samples in which the identities of the elements are known or are assumed to be known. In supervised training of acoustic models, a transcript of the sequence of speech elements is known, or the speaker has read from a known script. In unsupervised training, there is no known script or transcript other than that available from unverified recognition. In one form of semi-supervised training, a user may not have explicitly verified a transcript but may have done so implicitly by not making any error corrections when an opportunity to do so was provided.

"Acoustic model" is a model for generating a sequence of acoustic observations, given a sequence of speech elements. The acoustic model, for example, may be a model of a hidden stochastic process. The hidden stochastic process would generate a sequence of speech elements and for each speech element would generate a sequence of zero or more acoustic observations. The acoustic observations may be either (continuous) physical measurements derived from the acoustic waveform, such as amplitude as a function of frequency and time, or may be observations of a discrete finite set of labels, such as produced by a vector quantizer as used in speech compression or the output of a phonetic recognizer. The continuous physical measurements would generally be modeled by some form of parametric probability distribution such as a Gaussian distribution or a mixture of Gaussian distributions. Each Gaussian distribution would be characterized by the mean of each observation measurement and the covariance matrix. If the covariance matrix is assumed to be diagonal, then the multi-variant Gaussian distribution would be characterized by the mean and the variance of each of the observation measurements. The observations from a finite set of labels would generally be modeled as a non-parametric discrete probability distribution. However, other forms of acoustic models could be used. For example, match scores could be computed using neural networks, which might or might not be trained to approximate a posteriori probability estimates. Alternately, spectral distance measurements could be used without an underlying probability model, or fuzzy logic could be used rather than probability estimates.

"Language model" is a model for generating a sequence of linguistic elements subject to a grammar or to a statistical model for the probability of a particular linguistic element given the values of zero or more of the linguistic elements of context for the particular speech element.

"General Language Model" may be either a pure statistical language model, that is, a language model that includes no explicit grammar, or a grammar-based language model that includes an explicit grammar and may also have a statistical component.

"Grammar" is a formal specification of which word sequences or sentences are legal (or grammatical) word sequences. There are many ways to implement a grammar specification. One way to specify a grammar is by means of a set of rewrite rules of a form familiar to linguistics and to writers of compilers for computer languages. Another way to specify a grammar is as a state-space or network. For each state in the state-space or node in the network, only certain words or linguistic elements are allowed to be the next linguistic element in the sequence. For each such word or linguistic element, there is a specification (say by a labeled arc in the network) as to what the state of the system will be at the end of that next word (say by following the arc to the node at the end of the arc). A third form of grammar representation is as a database of all legal sentences.

"Stochastic grammar" is a grammar that also includes a model of the probability of each legal sequence of linguistic elements.

"Pure statistical language model" is a statistical language model that has no grammatical component. In a pure statistical language model, generally every possible sequence of linguistic elements will have a non-zero probability.

"Entropy" is an information theoretic measure of the amount of information in a probability distribution or the associated random variables. It is generally given by the formula $E=\Sigma_i\ p_i\ \log(p_i)$, where the logarithm is taken base 2 and the entropy is measured in bits.

"Classification Task" in a classification system is a partition of a set of target classes.

Figure 2:
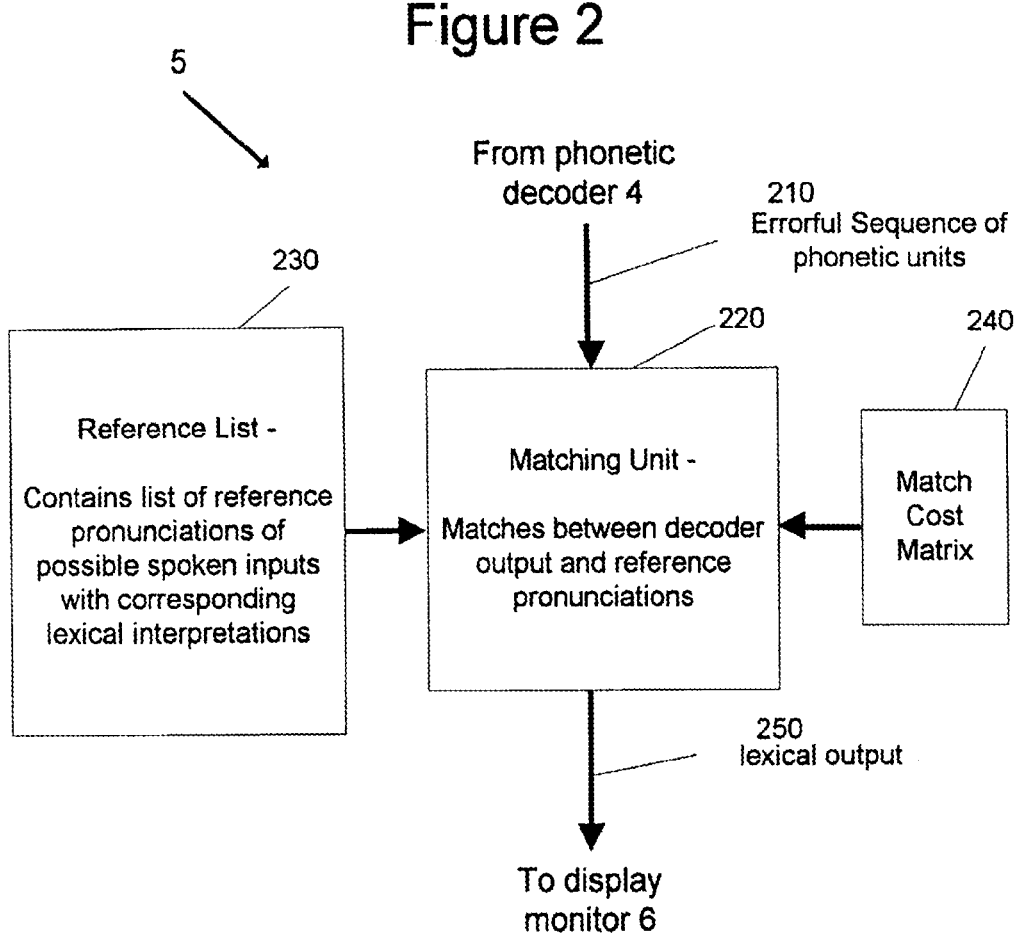
FIG. 2 is a block diagram showing elements making up a conventional lexical interpreter.

In the system shown in FIG. 1, there is a one-to-one correspondence between the symbol set generated by the phonetic recognizer (module 4 in FIG. 1) and that used as the reference set (as utilized by the lexical interpreter module 5 in FIG. 1). By using a lexical interpreter module 5' as shown in FIG. 3, according to the first embodiment of the invention as described herein, instead of the conventional lexical interpreter module 5 as shown in FIG. 2, however, there is no such one-to-one correspondence.

As shown in FIG. 3, the lexical interpreter module 5' receives the sequence of phonetic units 210 output from the phonetic decoder module 4 (see FIG. 1). The lexical interpreter module 5' also includes a matching unit 320 that matches the output of the phonetic decoder module 4 and reference pronunciations as obtained from a reference list 330. In the first embodiment, the reference list 330 contains a list of reference pronunciations of possible spoken inputs with corresponding lexical interpretations, as well as additional information (not included in the reference list 230 shown in FIG. 2). The matching unit 320 also utilizes information from a match cost matrix 340 in making its match determination, whereby the match cost matrix 340 includes additional information that is not provided in the match cost matrix 240 as shown in FIG. 2. The matching unit 320 outputs a lexical output 350, which is provided to the display monitor module 6 for display to a user (see FIG. 1).

With particular reference to the reference list 330 and the match cost matrix 340, vowels in words in American English and other languages can differ in their stress assignment. For example, the noun "permit" has a stressed first vowel and an unstressed second vowel, while those in the verb "permit" have the converse assignments. Normally, two or three levels of stress are used in describing the stress pattern of a word. In the case of three levels, they are normally labeled as "primary stress", "secondary stress" and "unstressed".

Speech recognizers, including phonetic recognizers, typically do not attempt to distinguish between stress levels in all vowel units. This is because in some circumstances it is difficult to identify the stress level of a vowel reliably. Stress correlates primarily with the relative loudness of a vowel, its relative duration and its relative pitch, all of which may be more difficult to determine than the general shape of the spectrum used for phonetic identification.

In the first embodiment, multiple stress levels are provided as additional information that is used in the reference representation of phonemes (as stored in the reference list 330), and they also appear as additional information in the match cost matrix 340 that is utilized by the lexical interpreter module 5' to determine a best match. According to one embodiment, the match cost matrix 340 encodes the probabilities of confusions between phonetic interpretations, and in the case of vowels these may depend on the stress level. A particular vowel with a low level of stress may, for example, be more likely to be apparently deleted (either because the speaker does not produce it or because it is shorter and less loud with the result that the phonetic recognizer module 4 fails to detect it). As shown in Table 3, unstressed vowels are in general less likely to be correctly recognized than corresponding stressed vowels.

In more detail, Table 3 shows an example set of estimated probabilities of observing vowel symbols output from the phonetic decoder module 4 (columns) corresponding to particular vowels in the reference pronunciations (rows), as provided in the match cost matrix 340 utilized by the lexical interpreter module 5' according to the first embodiment of the invention. The vowel symbols output from the phonetic decoder module 4 have no stress levels, while those in the reference pronunciations (stored in the reference list 330) have a digit appended signifying either primary stress (1), secondary stress (2) or unstressed (0). Cells in which the vowel identities correspond (i.e., the vowels are correctly recognized) are shown in bold type in Table 3. These probabilities are, as expected for a reasonably reliable recognizer, larger than the values in cells relating to non-corresponding vowels. Note that reference vowels with primary stress tend to have higher correct recognition probabilities than the corresponding unstressed forms, while those with secondary stress generally have intermediate probabilities. Table 3, with the probabilities converted to log probabilities, can be used to form part of the match cost matrix 340 to be used by the lexical interpreter module 5' according to the first embodiment. The information in Table 3 was obtained from experimental tests performed by the inventors.

TABLE 3

|     | AA    | AE    | AO    | AW    | AY    |
|-----|-------|-------|-------|-------|-------|
| AA0 | 0.175 | 0.080 | 0.163 | 0.030 | 0.028 |
| AA1 | 0.653 | 0.041 | 0.036 | 0.019 | 0.009 |
| AA2 | 0.524 | 0.055 | 0.144 | 0.020 | 0.014 |
| AE0 | 0.043 | 0.210 | 0.009 | 0.022 | 0.014 |
| AE1 | 0.022 | 0.683 | 0.004 | 0.013 | 0.05  |
| AE2 | 0.040 | 0.452 | 0.008 | 0.018 | 0.013 |
| AO0 | 0.061 | 0.024 | 0.189 | 0.044 | 0.016 |
| AO1 | 0.136 | 0.009 | 0.464 | 0.014 | 0.001 |
| AO2 | 0.112 | 0.012 | 0.408 | 0.038 | 0.014 |
| AW0 | 0.074 | 0.033 | 0.029 | 0.147 | 0.029 |
| AW1 | 0.026 | 0.015 | 0.011 | 0.756 | 0.003 |
| AW2 | 0.058 | 0.018 | 0.019 | 0.682 | 0.004 |
| AY0 | 0.018 | 0.076 | 0.007 | 0.004 | 0.403 |
| AY1 | 0.004 | 0.010 | 0.001 | 0.001 | 0.865 |
| AY2 | 0.009 | 0.022 | 0.004 | 0.004 | 0.527 |

To see how this might help, consider a reference list containing the proper nouns "Ackloff" and "Ocklaff", whose respective pronunciations can be represented as / AE1 K L AA0 F / and / AA1 K L AE0 F /. Suppose that the output from the phonetic recognizer (which does not attempt to distinguish between stress levels) is / AA K L AA F /. A conventional matching process that ignores stress would find that the output matched both reference possibilities equally well, since both matches would require just one substitution, namely from / AA / to / AE /. Taking stress into account, however, would reveal that "Ocklaff" is the more likely interpretation, since this requires / AA / to be substituted with / AE0 / (probability=0.043), while the "Ackloff" interpretation would require / AA / to be substituted with / AE1 / (probability=0.022).

A second embodiment of a lexical interpreter module 5' according to the invention will now be described in detail hereinbelow. Spoken words can be divided into syllables, whereby a syllable comprises a single vowel with zero, one or more consonants occurring before the vowel ("prevocalic" consonants) and zero, or one or more consonants occurring after the vowel ("postvocalic" consonants). Many published dictionaries indicate syllable boundaries as part of the indication of pronunciation. There are multiple criteria for the exact placement of syllable boundaries, as described for example by J. C. Wells, in "The English phonemic system and its notation: Syllabification," in "The Longman Pronunciation Dictionary," pp. xiv–xvi, published by Longman Group UK Ltd., in 1990, and it is also the case that experts do not agree in all cases with respect to where syllable boundaries occur. Syllable boundaries may be used to help the phonetic match process, and the use of syllable boundaries are utilized in order to aid in the lexical interpretation process as performed by the lexical interpreter module 5' according to the second embodiment.

It is a known feature that some consonants are realized differently in their pre- and postvocalic forms. See, for example, S. Greenberg, "Speaking in Shorthand—A Syllable-Centric Perspective for Understanding Pronunciation Variation", Proceedings of ESCA Workshop on Modeling Pronunciation Variation for Automatic Speech Recognition, pp. 47–56, published by Kekrade in 1998. In this regard, the plosive consonant /t/ may be pronounced with much less force in postvocalic position (e.g., "post", "lot") than it normally is in prevocalic position (e.g., "stem", "top"). Sometimes, there is no clear acoustic evidence of a postvocalic /t/. As a result of these differences, the probability of a postvocalic /t/ not appearing in the phonetic sequence generated by the phonetic decoder module 4 is much greater than that for a prevocalic /t/. Such information is stored in the list of reference pronunciations in the reference list 330 utilized by the lexical interpreter module 5' according to the second embodiment.

In the second embodiment, consonants are marked in the reference phonetic representations (stored in the reference list 330) as being pre- or postvocalic (e.g., via an appended ASCII symbol or symbols), and this distinction then appears in the match cost matrix 340 (as used by the lexical interpreter module 5') without the phonetic recognizer module 4 attempting to make the same distinction.

Table 4 illustrates the feature described above for the unvoiced plosive consonants in American English. In more detail, Table 4 provides an example set of estimated probabilities of observing vowel symbols from the phonetic decoder (columns) corresponding to particular vowels in the reference pronunciations (rows). The consonant symbols from the phonetic decoder 4 are not marked for location within the syllable, while those in the reference pronunciations have a character appended showing that they are postvocalic (<), or prevocalic (>). Cells in which the consonant identities correspond (i.e., the consonants are correctly recognized) are shown in bold in Table 4. The right-most column in Table 4 shows the estimated probability that a particular prevocalic or postvocalic consonant will not be detected at all in the output from the phonetic decoder. Note that the estimated probability of such deletion is much higher for the postvocalic unvoiced plosives than for the corresponding prevocalic ones. Table 4, with the probabilities converted to log probabilities, can be used to form part of the match cost matrix 340 utilized by the lexical interpreter module 5' according to the second embodiment. The information in Table 4 was obtained from experimental tests performed by the inventors.

TABLE 4

|  | K | P | T | (del) |
|---|---|---|---|---|
| K< | 0.890 | 0.028 | 0.034 | 0.045 |
| K> | 0.799 | 0.009 | 0.019 | 0.014 |
| P< | 0.017 | 0.609 | 0.035 | 0.163 |
| P> | 0.008 | 0.855 | 0.003 | 0.017 |
| T< | 0.033 | 0.017 | 0.495 | 0.336 |
| T> | 0.009 | 0.009 | 0.783 | 0.067 |

To see how this might help, consider a reference list containing the items "top" and "pot", whose respective pronunciations can be represented as / T AA1 P / and / P AA1 T /. Suppose that the output from the phonetic recognizer (which does not attempt to distinguish between stress levels or pre- and post-vocalic consonants) is / P AA P /. A conventional matching process that ignores differences between pre- and post-vocalic consonants would find that the output matched both reference possibilities equally well, since both matches would require just one substitution, namely from P to T. Taking pre- and post-vocalic differences into account, however, would reveal that "pot" is the more likely interpretation, since this requires / P / to be substituted with / T < / (probability=0.017), while the "top" interpretation would require / P / to be substituted with / T > / (probability=0.009).

A third embodiment of a lexical interpreter module 5' according to the invention will now be described in detail hereinbelow, in which it utilizes combined phonetic units and freely deletable phonetic units.

It is well known that some words may have two or more acceptable pronunciations. In one way of dealing with this in speech recognition, all acceptable pronunciations are entered as separate entries in the reference list. The lexical interpreter module 5' shown in FIG. 3 matches the output /ch ey m s m ih/ of the phonetic recognizer module 4 against all of the alternative pronunciations (obtained from the reference list 330), and the best match is taken as the score for this lexical item.

The third embodiment makes use of the feature that certain groups of words contain the same kind of variation between acceptable pronunciations, and the variation is localized in one or more independent phonemes. For example the orthographic sequence "ei" occurring in proper nouns ending in "stein" may be pronounced like the vowel sound occurring in the word "sight" (often represented as /AY/) or like the vowel sound occurring in the word "seed" (often represented as /IY/). Rather than listing at least two pronunciations for all such words, the third embodiment introduces in the reference description of a reference pronunciation (stored in the reference list 330 as shown in FIG. 3) a new symbol that is interpreted as meaning that either vowel is acceptable, whereby this new symbol is included as additional information in the reference list 330. This symbol may be "AY-IY," for example, or some other special symbol.

The same multi-phoneme symbol can also be used for other classes of words, such as "either" and "neither".

Apart from making the reference list more compact and thereby requiring less storage space, this kind of representation of certain multiple pronunciations can be used to reduce the amount of computation needed in the matching process. Rather than having to match the complete word or phrase several times, corresponding to all combinations of the alternative pronunciations, a single match can be carried out, in which when matching against multi-phoneme reference symbols the best-scoring match against each possible phoneme in the multi-phoneme set is used.

In a fourth embodiment of a lexical interpreter module 5' according to the invention, which can be utilized by itself or together with the features described with respect to the third embodiment, the efficiency of the matching process can be further improved by adding to the match cost matrix 340 a special set of costs corresponding to each multi-phoneme unit and corresponding to the minimum of the corresponding costs for the individual phonemes, whereby this special set of costs is included as additional information in the match cost matrix 340. Thus, in the example described above, the substitution cost between the "stein" multi-phoneme symbol and, say, the vowel normally occurring in "bit" would be the minimum of the substitution cost between this vowel and the vowel in "sight" and that in "seed". Similarly, the deletion cost of the-multi-phoneme unit would be the minimum of the individual deletion costs for the "sight" and "seed" vowels.

In another kind of pronunciation variation as utilized by a lexical interpreter module 5' according to a fifth embodiment, alternatives may exist in which a phoneme may be present or absent. An example occurs in "exempt", where a "p" may or may not be pronounced and another in the family name "Dicke", where a second vowel may or may not be pronounced at the end of the word. Again, the conventional way of dealing with this would be to list two pronunciations. The method utilized by the lexical interpreter module 5' according to the fifth embodiment is to mark the phoneme in the reference representation stored in the reference list 330 as being freely deletable (such as with a special symbol such as "-", in which case the reference pronunciation of "exempt" would contain the symbol "P-"). In the match cost matrix 340, the deletion cost of this freely deletable unit is then set to zero or at least some value lower than the deletion cost for the corresponding reference unit (e.g. "P") not marked as freely deletable.

In a sixth embodiment of the invention, both vowel stress information and pre-vocalic/post-vocalic information is used by the lexical interpreter module 5'.

It should be noted that although the flow charts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps. It should also be noted that the word "module" or "component" or "unit" as used herein and in the claims is intended to encompass implementations using one or more lines of software code, and/or hardware implementations, and/or equipment for receiving manual inputs.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. For example, the lexical interpreter module may perform lexical interpretation at a syllable level utilizing the features described above with respect to one or more embodiments of the invention, in which case a syllable decoder (instead of a phonetic decoder) would provide a syllable sequence (or lattice of syllables) to the lexical interpreter module.

What is claimed is:

1. A method for performing speech recognition, the method comprising:
   receiving at least a phonetic sequence from a phonetic recognizer, wherein the phonetic sequence comprises at least a portion of an output of the phonetic recognizer, the output corresponding to a spoken input received by the phonetic recognizer;
   selecting one of a plurality of reference phoneme sequences stored in a reference list based on a comparison of the phonetic sequence with one or more of the plurality of reference phoneme sequences, wherein selecting one of the plurality of reference phoneme sequences includes using additional information provided independently of the phonetic recognizer and with at least one of the plurality of reference phoneme sequences, wherein the additional information is indicative of whether a given one or more of the plurality of reference phoneme sequences corresponds to at least a portion of the phonetic sequence.

2. The method of claim 1, wherein selecting one of the plurality of reference phoneme sequences includes using additional information that is indicative of phoneme stress level.

3. The method of claim 2, wherein the additional information is stored as a particular ASCII character.

4. The method of claim 2, wherein using the additional information includes using: a first value that is indicative of an unstressed level, a second value that is indicative of a first stress level that is greater than the unstressed level, and a third value that is indicative of a second stress level that is greater than the first stress level.

5. The method of claim 2, wherein using the additional information includes using additional information that is indicative of the phoneme stress level for at least one vowel in each of the reference phoneme sequences.

6. The method of claim 1, wherein the step of selecting one of the plurality of reference phoneme sequences includes using additional information provided with a match cost matrix that includes information indicative of phoneme stress levels of the plurality of reference phoneme sequences.

7. The method of claim 1, wherein selecting one of the plurality of reference phoneme sequences includes using additional information that is indicative of the phoneme stress level to enable selection of the one of the plurality of reference phoneme sequences when the output of the phonetic recognizer does not distinguish between different phonetic stress levels occurring in a corresponding spoken input.

8. The method of claim 1, wherein selecting one of the plurality of reference phoneme sequences includes using additional information that identifies one or both of prevocalic and postvocalic consonants from a given reference phoneme sequence in the plurality of reference phoneme sequences.

9. The method of claim 8, wherein selecting one of a plurality of reference phoneme sequences includes: using the additional information from a match cost matrix that includes information that is indicative of occurrences of postvocalic consonants and/or prevocalic consonants in one or more of the plurality of reference phoneme sequences.

10. The method of claim 9, wherein selecting one of the plurality of reference phoneme sequences includes using additional information that is indicative of one or both of prevocalic and postvocalic consonants when the output of the phonetic recognizer does not distinguish between postvocalic consonants and prevocalic consonants occurring in a corresponding spoken input.

11. The method of claim 1, wherein using additional information includes using, in one or more of the reference phoneme sequences, a multi-phoneme representation that provides alternative acceptable pronunciations corresponding to two or more alternative phonemes.

12. The method of claim 11, wherein the multi-phoneme representation can be represented by a particular ASCII character sequence in the reference list.

13. The method of claim 12, wherein the multi-phoneme representations are included in a match cost matrix, and wherein a cost corresponding to a particular multi-phoneme representation corresponds to a cost of the two or more alternative phonemes and of the phonetic sequence being considered for the comparison.

14. The method of claim 1, wherein selecting one of the plurality of reference phoneme sequences includes using, for a given phoneme in a reference phoneme sequence in the plurality of reference phoneme sequences, information about one or more phonemes that are adjacent to the given phoneme sequence in the plurality of reference phoneme sequences.

15. The method of claim 1, wherein selecting one of a plurality of reference phoneme sequences stored in a reference list includes using additional information about whether a syllable boundary affects a given phoneme that precedes or follows a given phoneme in a reference phoneme sequence in the plurality of reference phone sequences.

16. The method of claim 15, wherein the additional information identifies the syllable boundary that most closely precedes or follows the given phoneme.

17. The method of claim 1, wherein selecting one of a plurality of reference phoneme sequences stored in a reference list includes using a probability value that a particular reference phoneme sequence corresponds to a given phonetic sequence that is outputted from the phonetic recognizer.

18. The method of claim 1, wherein using additional information includes using, in one or more of the reference phoneme sequences, a multi-phoneme representation that includes a deletable phoneme, wherein the multi-phoneme representation provides alternative acceptable pronunciations corresponding to use and non-use of the deletable phoneme.

19. A speech recognition apparatus, comprising:
   an input unit configured to receive an output of a phonetic recognizer, wherein the output includes at least a phonetic sequence that corresponds to a speech-utterance received by the phonetic recognizer;

a reference list configured to store a plurality of reference phoneme sequences;

a matching unit configured to select one of the plurality of reference phoneme sequences from the reference list based on a comparison of the phonetic sequence with one or more phoneme sequences in the reference list, wherein the matching unit is configured to select one of the plurality of reference phoneme sequences using additional information that is (i) provided with at least one of the plurality of reference phoneme sequences independently of the output of the phonetic recognizer, and (ii) is indicative of whether a given one or more of the plurality of reference phoneme sequences corresponds to at least a portion of the phonetic sequence.

20. The speech recognition apparatus of claim 19, wherein the matching unit is configured to use the additional information—that includes information which is indicative of phoneme stress levels of one or more of the reference phoneme sequences in the reference list.

21. The speech recognition apparatus of claim 19, wherein the matching unit is configured to select one of the reference phoneme sequences using additional information that is indicative of the phoneme stress level when the phonetic recognizer does not distinguish between different phonetic stress levels occurring in a corresponding acoustic sequence input.

22. The speech recognition apparatus of claim 19, wherein the matching unit is configured to select one of the plurality of reference phoneme sequences using additional information that is indicative of prevocalic and postvocalic consonants.

23. The speech recognition apparatus of claim 19, wherein the speech recognition apparatus corresponds to a lexical interpreter that provides output by a display monitor unit of a speech recognition system.

24. The speech recognition apparatus of claim 19, further comprising:

a match cost matrix that stores at least some of the additional information, including information corresponding to occurrences of postvocalic consonants and prevocalic consonants for one or more of the plurality of reference phoneme sequences in the reference list.

25. The speech recognition apparatus of claim 19, wherein the matching unit is configured to use additional information that is indicative of postvocalic consonants and prevocalic consonants when the phonetic recognizer does not distinguish between postvocalic and prevocalic consonants occurring in a corresponding spoken input.

26. The speech recognition apparatus of claim 19, wherein, for one or more of the reference phoneme sequences, the additional information corresponds to a multi-phoneme representation that provides alternative acceptable pronunciations corresponding to two or more alternative phonemes.

27. The speech recognition apparatus of claim 26, wherein the multi-phoneme representation can be represented by a particular ASCII character in the reference list.

28. The apparatus of claim 19, wherein the matching unit is further configured to use, for a given phoneme in a reference phoneme sequence in the plurality of reference phoneme sequences, information about one or more phonemes that are adjacent to the given phoneme.

29. The speech recognition apparatus of claim 19, wherein, for one or more of the reference phoneme sequences, the additional information corresponds to a multi-phoneme representation that includes a deletable phoneme, wherein the multi-phoneme representation provides alternative acceptable pronunciations corresponding to use and non-use of the deletable phoneme.

30. A program product having machine-readable program code for performing speech recognition, the program code, when executed, causing a machine to perform steps that include:

receiving a phonetic sequence, wherein the phonetic sequence comprises at least a portion of an output of a phonetic recognizer, the output corresponding to a speech utterance received by the phonetic recognizer;

selecting one of a plurality of reference phoneme sequences stored in a reference list based on a comparison of the phonetic sequence with one or more phoneme sequences in the plurality of reference phoneme sequences, wherein selecting one of the plurality of reference phoneme sequences includes using additional information, the additional information being provided independently of the output of the phonetic recognizer and with at least one of the plurality of reference phoneme sequences, wherein the additional information is indicative of whether a given one or more of the plurality of reference phoneme sequences corresponds to at least a portion of the phonetic sequence.

31. The program product of claim 30, wherein the additional information is indicative of phoneme stress level and is stored in the reference list.

32. The program product of claim 31, wherein the additional information that is indicative of the phoneme stress level is stored as a particular ASCII character.

33. The program product of claim 31, wherein the additional information comprises: a first value that is indicative of an unstressed level, a second value that is indicative of a first stress level that is greater than the unstressed level, and a third value that is indicative of a second stress level that is greater than the first stress level.

34. The program product of claim 33, wherein the additional information that is indicative of the phoneme stress level is stored in the reference list for at least one vowel in each of the reference phoneme sequences.

35. The program product of claim 33, wherein the additional information is indicative of one or both of prevocalic and postvocalic consonants.

36. The program product of claim 30, wherein the program code, when executed, causes the machine to use, for a selected phoneme in a reference phoneme sequence, information about one or more phonemes that are adjacent to the selected phoneme in a listing of the plurality of reference phoneme sequences.

37. The program product of claim 31, wherein the additional information includes, for a given phoneme in a reference phoneme sequence in the plurality of reference phoneme sequences, information about one or more phonemes that are adjacent to the given phoneme.

* * * * *